United States Patent [19]
Kiso et al.

[11] Patent Number: 5,325,665
[45] Date of Patent: Jul. 5, 1994

[54] CATALYTIC CONVERTER ARRANGEMENT

[75] Inventors: Kimitsugu Kiso; Hideharu Ehara, both of Kanagawa, Japan

[73] Assignee: Nissan Motor Co., Ltd., Yokohama, Japan

[21] Appl. No.: 956,986

[22] Filed: Oct. 6, 1992

[30] Foreign Application Priority Data

Oct. 7, 1991 [JP] Japan .............................. 3-081299[U]

[51] Int. Cl.$^5$ .............................................. F01N 3/28
[52] U.S. Cl. ........................................ 60/300; 60/303; 422/171; 422/174
[58] Field of Search .................. 60/300, 303; 422/174, 422/171

[56] References Cited

U.S. PATENT DOCUMENTS

| | | | |
|---|---|---|---|
| 5,106,588 | 4/1992 | Sims | 60/299 |
| 5,140,813 | 8/1992 | Whittenberger | 422/174 |
| 5,146,743 | 9/1992 | Maus | 60/300 |

FOREIGN PATENT DOCUMENTS 2333092 1/1975 Fed. Rep. of Germany ........ 60/300

*Primary Examiner*—Douglas Hart
*Attorney, Agent, or Firm*—Foley & Lardner

[57] ABSTRACT

A catalytic converter arrangement incorporated in an exhaust system of an internal combustion engine includes an exhaust manifold for ducting emissions from the engine; and first and second catalytic converters. The first catalytic converter is connected to and positioned immediately downstream from the exhaust manifold. The first catalytic converter has a ceramic catalyst support on an upstream side thereof and a metal catalyst support on a downstream side thereof. The second catalytic converter is connected to the first catalytic converter through an exhaust pipe and positioned downstream from the first catalytic converter. The second catalytic converter has a ceramic catalyst support. Thus, overheating of the metal catalyst support of the first catalytic converter can be prevented due to absorption of heat from emissions by the ceramic catalyst support of the first catalytic converter.

1 Claim, 2 Drawing Sheets

CATALYTIC CONVERTER ARRANGEMENT

BACKGROUND OF THE INVENTION

1. Field of the Invention

The present invention relates in general to a catalytic converter arrangement of an automotive exhaust system, and more particularly to a catalytic converter arrangement in which an electrically-heatable metal catalyst support is incorporated.

2. Description of the Prior Art

A catalytic converter is incorporated into an automotive exhaust system for transforming noxious emissions such as CO, HC and $NO_x$ into harmless gases such as $CO_2$, $N_2$ and $H_2O$.

When a catalytic converter is positioned in an engine room or compartment and immediately downstream from an engine exhaust manifold, a catalyst support of the catalytic converter is easily heated, due to the heated emission from the exhaust manifold, up to an operating temperature where a catalyst coated on the catalyst support begins catalytic activity. However, due to a limited space of the engine room, the catalytic converter positioned in the engine room is not in general permitted to be so sized as to fully clean up noxious emissions. Therefore, there is provided another catalytic converter below an automotive body for supplementing the catalytic converter in the engine room.

Both of their above-mentioned catalytic converters are not heated up to the operating temperatures within a short time after the engine has been started. Therefore, in some automobiles, the catalytic converter in the engine room has an electrically-heatable metal catalyst support for rapidly increasing the temperature of the catalyst support up to its operating temperature. One such type of catalytic converter arrangement has a first catalytic converter which is positioned in the engine room and immediately downstream from the engine exhaust manifold, and a second catalytic converter which is positioned below the automotive body. The first catalytic converter has an upstream portion which has an electrically-heatable metal catalyst support, and a downstream portion which has a ceramic catalyst support. However, this conventional catalytic converter arrangement has the following drawback.

Since the metal catalyst support of the first catalytic converter is positioned immediately downstream from the exhaust manifold, it tends to be overheated after the engine has been warmed up. With this, durability of the first catalytic converter is shortened.

SUMMARY OF THE INVENTION

It is therefore an object of the present invention to provide an improved catalytic converter arrangement so as to improve durability of an electrically-heatable metal catalyst support.

According to the present invention, there is provided a catalytic converter arrangement incorporated in an exhaust system of an internal combustion engine, the arrangement including: an exhaust manifold for ducting emissions from the engine; and a first catalytic converter which is connected to and positioned immediately downstream from the exhaust manifold, said first catalytic converter having a ceramic catalyst support on an upstream side thereof and a metal catalyst support on a downstream side thereof.

DESCRIPTION OF THE PREFERRED INVENTION

Figure 1:
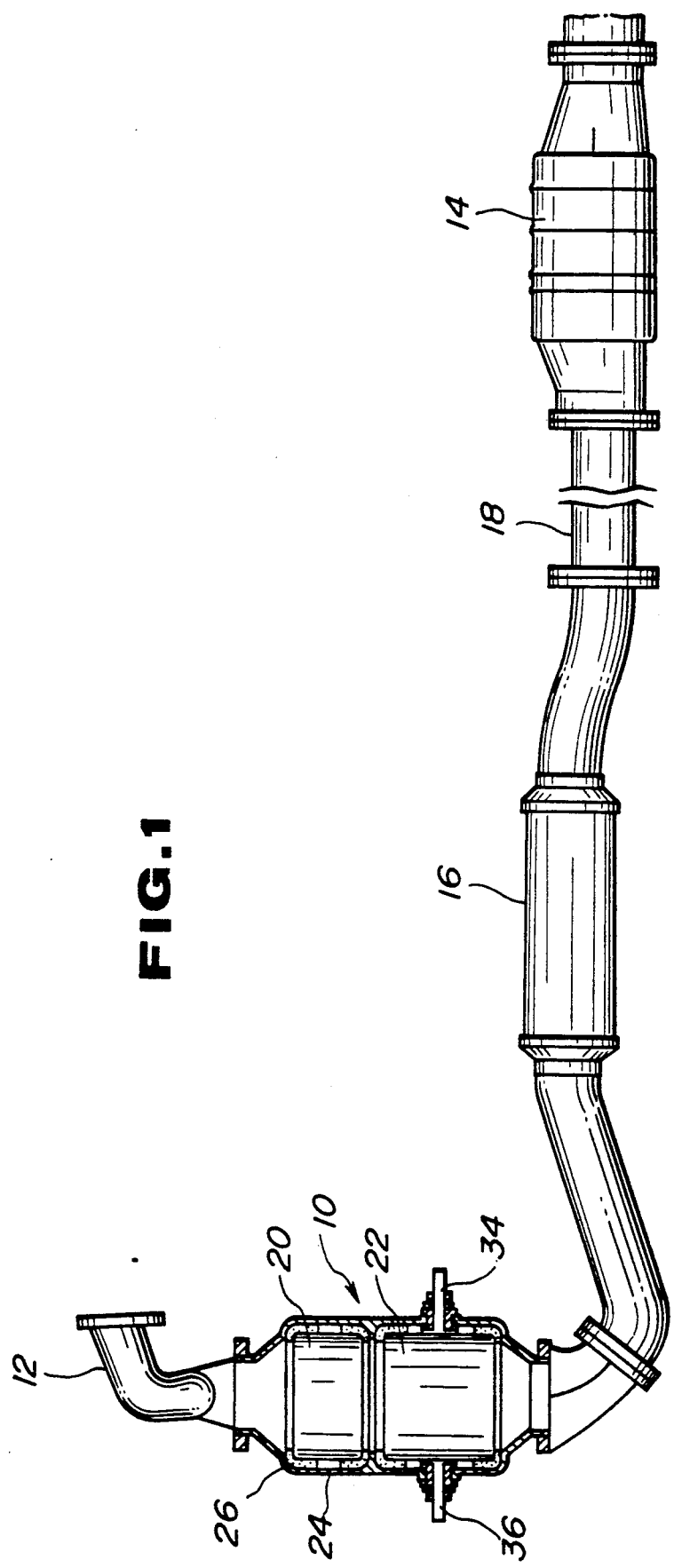
FIG. 1 is a plan view of a catalytic converter arrangement which is incorporated into an automotive exhaust system, but showing a cutaway of a first catalytic converter.
Figure 2:
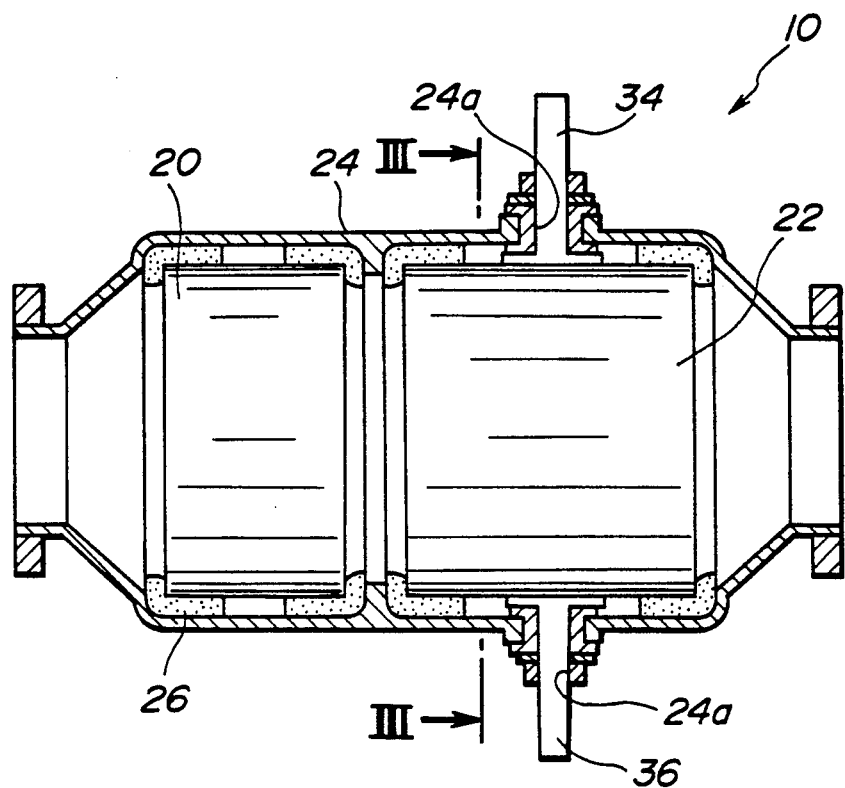
FIG. 2 is an enlarged and cutaway view of the first catalytic converter.
Figure 3:
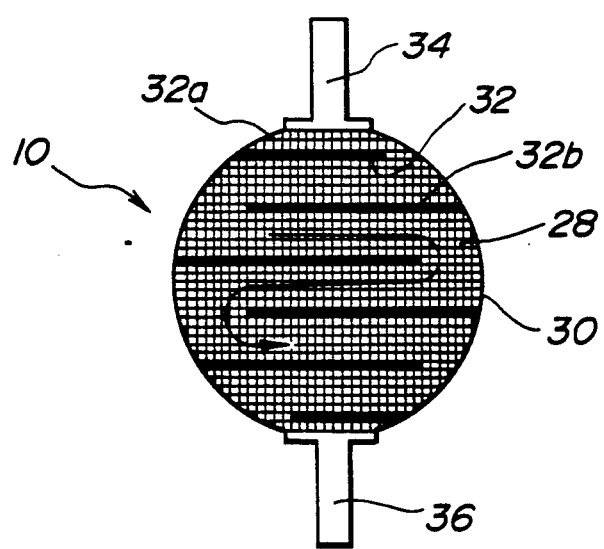
FIG. 3 is a transverse cross-sectional view which is taken along the line III—III of FIG. 2.

Referring to FIGS. 1 to 3, there is provided a catalytic converter arrangement which is incorporated into an automotive exhaust system.

As is seen from FIG. 1, there is provided a first catalytic converter 10 which is positioned immediately downstream from and directly connected to an engine exhaust manifold 12. There is provided a second catalytic converter 14 which is connected to the first catalytic converter 10 through front and rear exhaust pipes 16 and 18.

The first catalytic converter 10 has a ceramic catalyst support 20 on its upstream side and an electrically-heatable metal catalyst support 22 on its downstream side. That is, noxious emissions from the exhaust manifold 12 are first passed through a honeycomb structure of the ceramic catalyst support 20, and then through a honeycomb structure of the metal catalyst support 22. The ceramic and metal catalyst supports 20 and 22 are received in a housing 24 which is of a one-piece construction. However, if desired, the ceramic and metal catalyst supports 20 and 22 may be respectively received in first and second housings which are to be connected to each other.

As is seen from FIGS. 1 and 2, numeral 26 designates a plurality of gas sealing members which are interposed between the ceramic and metal catalyst supports 20, 22 and the housing 24.

As is seen from FIG. 3, the honeycomb structure of the metal catalyst support 22 is made up of a plurality of latticed metal plates 28 which are received in a hallow cylindrical metal plate 30. Furthermore, there are provided a plurality of insulating plates 32 in the metal catalyst support 22. The insulating plates 32 are so arranged such that a first insulating plate 32a is directly connected at only its left end to the cylindrical metal plate 30 and a second insulating plate 32b is directly connected at only its right end to the cylindrical plate 30, and so on, as illustrated in FIG. 3. Positive and negative terminals 34 and 36 are electrically connected to the upper and lower end portions of the cylindrical metal plate 30, as is illustrated in FIG. 3. The housing 24 of the first catalytic converter has two through holes 24a at its diametrically opposed portions so as to allow the positive and negative terminals 34 and 36 to pass therethrough. Therefore, when the metal catalyst support 22 is electrically energized by closing a switch (not shown), the electric current flows substantially serpentinely by the provision of the insulating plates, as is shown by an arrow of FIG. 3. That is, since a long pathway of the electric current is provided in the metal catalyst support 22, a large amount of heat is generated by the metal catalyst support 22. This heat is transferred conductively to the catalyst coated on the support 22. Therefore, after the engine has been started, the temperature of the catalyst increases relatively rapidly to its operating temperature so as to efficiently transform noxious emissions to harmless gases. If desired, a void space may be substituted for the insulating plate 32 for the purpose of electrical insulation.

The above-mentioned second catalytic converter 14 has only one ceramic catalyst support (not shown). The capacity of the second catalytic converter 14 to transform noxious emission to harmless gases is larger than that of the first catalytic converter 10.

Operation of the catalytic converter arrangement according to the present invention will be described in the following.

Within a short time after the engine has been started, the switch of the metal catalyst support 22 of the first catalytic converter 10 is closed so as to allow the temperature of the catalyst coated on the metal catalyst support 22 to increase rapidly to its operating temperature. The noxious emissions from the exhaust manifold 12 are transformed into harmless gases by the first and second catalytic converters 10 and 14.

After the engine has been warmed up, the switch of the metal catalyst support is opened so as to no longer electrically heat the metal catalyst support. Such heating is no longer needed because the noxious emissions have a relatively high temperature due to the warmed-up engine exhaust flow from the exhaust manifold 12 into the ceramic catalyst support 20 of the first catalytic converter 10. It should be noted that heat of the noxious emissions is absorbed to a certain degree by the ceramic catalyst support 20. Then, noxious emissions having a lowered temperature flow from the ceramic catalyst support 20 into the metal catalyst support 22. Therefore, after the engine has been warmed up, overheating of the metal catalyst support 22 and damage to the positive and negative terminals 34 and 36 can be prevented or at least minimized, thereby improving the durability of the first catalytic converter.

What is claimed is:

1. A catalytic converter arrangement incorporated in an exhaust system of an internal combustion engine, said arrangement comprising:

(a) an exhaust manifold for ducting emissions from said engine; and (b) a first catalytic converter positioned in an engine compartment, said first catalytic converter connected to and positioned immediately downstream from said exhaust manifold and having a metal catalyst support adapted to be electrically heated and a ceramic catalyst support on an upstream side of said metal catalyst support, and (c) a second catalytic converter which is connected to and positioned downstream from said first catalytic converter through front and rear exhaust pipes, said second catalytic converter having a ceramic catalyst support, and having a capacity which is larger than that of said first catalytic converter.

* * * * *